(12) United States Patent  
Rothschild

(10) Patent No.: US 8,799,263 B2  
(45) Date of Patent: Aug. 5, 2014

(54) SYSTEMS, DEVICES, AND METHODS FOR PROVIDING MULTIDIMENSIONAL SEARCH RESULTS

(76) Inventor: Leigh M Rothschild, Sunny Isles Beach, FL (US)

( * ) Notice: Subject to any disclaimer, the term of this patent is extended or adjusted under 35 U.S.C. 154(b) by 94 days.

(21) Appl. No.: 13/368,326

(22) Filed: Feb. 7, 2012

(65) Prior Publication Data

US 2013/0060812 A1 Mar. 7, 2013

Related U.S. Application Data

(60) Provisional application No. 61/530,976, filed on Sep. 4, 2011.

(51) Int. Cl.  
*G06F 17/30* (2006.01)

(52) U.S. Cl.  
USPC .......................................................... 707/710

(58) Field of Classification Search  
USPC ........................... 707/771, 707, 710, 722, 805  
See application file for complete search history.

(56) References Cited

U.S. PATENT DOCUMENTS

| | | | |
|---|---|---|---|
| 7,428,530 B2 * | 9/2008 | Ramarathnam et al. ............... 1/1 |
| 7,873,622 B1 * | 1/2011 | Karls et al. .................... 707/707 |
| 7,966,309 B2 * | 6/2011 | Shacham et al. ............... 707/708 |
| 2002/0055891 A1 * | 5/2002 | Yang ............................... 705/27 |
| 2003/0164827 A1 * | 9/2003 | Gottesman et al. ............ 345/419 |
| 2008/0172362 A1 * | 7/2008 | Shacham et al. ................... 707/3 |
| 2011/0090306 A1 * | 4/2011 | Suh et al. ......................... 348/42 |
| 2012/0038745 A1 * | 2/2012 | Yu et al. .......................... 348/46 |
| 2013/0097554 A1 * | 4/2013 | Wyeld ........................... 715/782 |

* cited by examiner

*Primary Examiner* — Cam-Linh Nguyen  
(74) *Attorney, Agent, or Firm* — Atanu Das; Techlaw LLP

(57) ABSTRACT

Embodiment of the disclosure may includes systems, methods, and devices for providing multidimensional search results on a plurality of search planes. Such systems, methods, and devices may: (i) receive one or more search terms from one or more user interfaces of the system; (ii) perform a search of one or more informational repositories to obtain a list of search results wherein the informational repositories may include the Internet and one or more databases; (iii) process the list of search results to classify each search result in one of a plurality of categories; (iv) cause a presentation of the search results in a plurality of search planes on the display of the system such that each search plane corresponds to one of the plurality of categories. In addition, the software applications may include a sorting software application that groups the list of search results into one of a plurality of categories.

17 Claims, 7 Drawing Sheets

SYSTEMS, DEVICES, AND METHODS FOR PROVIDING MULTIDIMENSIONAL SEARCH RESULTS

CROSS-REFERENCE TO RELATED APPLICATIONS

The present application claims priority under the laws and rules of the United States, including 35 USC §120, to U.S. Provisional Patent Application No. 61/530,976 filed on Sep. 4, 2011. The contents of U.S. Provisional Patent Application No. 61/530,976 are herein incorporated by reference.

BACKGROUND

Searching databases and the Internet is an essential aspect of gaining knowledge in today's information age. Many different companies provide search engines that are capable of providing a list of search results, usually containing Internet/ website links, images, and/or videos, in response to a keyword or search term entered in by a user through a web browser or some other user interface. The links are to websites, images, or videos that may relate to the keyword or search term entered by the user. Some search engines allow images to be uploaded as an input to the search engine and provide results that list images that are similar to the uploaded image or links to websites that provide information related to the uploaded image. In either search scenario, search engines provide a simple list of results (text with links, images, video, etc) that are not ordered or grouped in any manner that can be configured by the user or by the search engine.

Further, three dimensional (3D) display technology is emerging in today's markets. So much so that televisions as well as computer displays are being sold supporting 3D technology. Television, cable, satellite, and Internet (streaming video) providers have emerged to provide 3D content and programming to fully utilize the 3D technology on televisions and computer displays used by the end consumer.

SUMMARY

The pending disclosure describes embodiments that include systems, methods, and devices for providing multidimensional search results or categories of search results on different search planes. Several embodiments provide the multidimensional search results that may be displayed in a television or computer display having two dimensional (2D) technology. Other embodiments may display the multidimensional search results on television or computers display enhanced by 3D technology.

One embodiment allows a user to enter a key word or phrase (image, video, audio, spoken word(s), etc.) into a web browser or user interface of a client computing device such as a desktop computer, laptop computer, tablet computer, smartphone, mobile, television, or other computing device. Such a client computing device may also be called a media player system as such client computing devices allows a user to view digital content that includes Internet/website content, images, and video. The client computing device may be coupled to a computer server across a communication network (wireless or wired). The client computing device may have one or more client software applications that provide the computer server with the entered key word or phrase. The computer server may operate a search engine (software application) that conducts a search of the Internet or one or more databases (information repositories) based on the key word or phrase and retrieves/compiles a list of search results. Further, the computer server may also execute one or more software applications that implement one or more algorithms to order or organize the search results and present the search results in a multidimensional framework to the display or screen of the client computing device. Moreover, computer server software applications or client software applications may format the multidimensional search results in different ways depending on the type of display technology on the screen of the client computing device. For example, if the client computing device is equipped with 2D technology then the multidimensional search results are formatted to be displayed on a 2D display. Alternatively, for example, if the client computing device is equipped with 3D technology then the multidimensional search results are formatted to be displayed on a 3D display.

In some embodiments the algorithms implemented by the server software applications may organize the search results into different groups or categories. For example, if the keyword or phrase was the name of an actor, then the sorting software applications implementing the algorithms to organize or order the search results may group the search results by informational (mostly text) websites such as entertainment websites, blogs, etc, 2D images of the actor such as still photographs of the actor at awards shows or interviews, and video of the actor such as movies in streaming video format or movie trailers. The formatting software application may format the search results such that each group is on a different dimensional search plane when presented on a display of the client computing device.

An embodiment of the disclosure may be an example method for providing multidimensional search results on a plurality of search planes. Such a method may include the steps of receiving one or more search terms from one or more user interfaces of a media playing system and performing a search of one or more informational repositories to obtain a list of search results wherein the informational repositories may include the Internet and one or more databases. Further steps in the example method may be processing the list of search results using one or more software applications to classify each search result in one of a plurality of categories and causing a presentation of the search results on a plurality of search planes on a display of the media playing system such that each search plane corresponds to one of the plurality of categories.

An additional step may include sorting the list of search results using a sorting software application into one of a plurality of categories. Other steps may include receiving display input such that the display input indicates that the display supports two dimensional images and formatting the presentation of the search results using a two dimensional formatting software application. Alternative steps may be receiving display input such that the display input indicates a display supports three dimensional images and formatting the presentation of the search results using a three dimensional formatting software application.

Further steps in the example method may be receiving a plane selection input from the display, user interface, or input device (via an input receiver) and reformatting the presentation of the search results based on the place selection input using the formatting software application such that the formatting software application is selected from the group consisting of the two dimensional formatting software application and the three dimensional formatting software application.

Additional steps in the method may be detecting a plurality of subdisplays as part of the screen of the media playing system and causing a split presentation of the search results on the plurality of search planes such that a subset of the plurality of dimensional planes are presented on each subdisplay of the media playing system. A subdisplay may be one or more areas shown on a screen, each area showing different digital content. For example, a split screen display format may have two subdisplays shown on the screen, each taking half the area of the screen. Alternatively, a screen may be in picture-picture mode such that there are two subdisplays on the screen, one taking a larger area of the a screen than the other one.

Another embodiment of the disclosure may be a system for providing multidimensional search results on a plurality of search planes that includes one or more processors, one or more storage devices coupled to the one or more processors, and one or more communication interfaces, such that a first communication interface coupled to the one or more processors and coupled to the communication network. Further components of the system may include one or more user interfaces coupled to the one or more processors, a display coupled to the one or more processors, and one or more software applications. Further, the software applications may: (i) receive one or more search terms from one or more user interfaces of the system; (ii) perform a search of one or more informational repositories to obtain a list of search results wherein the informational repositories may include the Internet and one or more databases; (iii) process the list of search results to classify each search result in one of a plurality of categories; (iv) cause a presentation of the search results in a plurality of search planes on the display of the system such that each search plane corresponds to one of the plurality of categories. In addition, the software applications may include a sorting software application that groups the list of search results into one of a plurality of categories.

The system may also include an input receiver that detects display input from the display that indicates the display supports two dimensional images and a two dimensional formatting software application that causes the presentation of the search results in two dimensional images on the display. The input receiver may detect display input from the display that indicates the display supports three dimensional images and a three dimensional formatting software application that causes the presentation of the search results in three dimensional images on the display. Further, a plane selection input may be received from the display and causes the reformatting the presentation of the search results based on the place selection input using the formatting software application such that the formatting software application is selected from the group consisting of the two dimensional formatting software application and the three dimensional formatting software application. Also, a plurality of subdisplays may be detected as part of the system and the system causes a split presentation of the search results in a plurality of search planes such that a subset of the plurality of search planes are presented on each subdisplay of the system.

The embodiment of the disclosure may also include a system for providing multidimensional search results on a plurality of search planes that includes a communication network and a remote computer server coupled to the communication network. The remote computer server may have one or more server processors, one or more server storage devices coupled to the one or more processors and one or more server software applications executed by the one or more processors. The remote server may also includes one or more server communication interfaces such that a first server communication interface coupled to the one or more processors and coupled to the communication network.

Another component to the system may be a media playing system coupled to the remote computer server over the communication network. The media playing system may include one or more system processors, one or more system storage devices coupled to the one or more processors, and one or more system software applications executed by the one or more processors. The media playing system may include one or more system communication interfaces such that a first system communication interface coupled to the one or more processors and coupled to the communication network as well as one or more user interfaces coupled to the one or more processors and one or more displays coupled to the one or more processors. Also, the media playing system may include one or more server software applications that: (i) receive one or more search term from one or more user interfaces of the system; (ii) perform a search of one or more informational repositories to obtain a list of search results wherein the informational repositories may include the Internet and one or more databases; (iii) process the list of search results to classify each search result in one of a plurality of categories; and (iv) transmit the list of search results to the media playing system over the communication network.

Further, the one or more system software applications cause a presentation of the search results in a plurality of search planes on a display of the media playing system such that each search plane corresponds to one of the plurality of categories. The system software applications include a server sorting software application that groups the list of search results into one of a plurality of categories.

In addition an input receiver located in the media player system may detect display input from a display that indicates the display supports two dimensional images such that a two dimensional formatting software application that causes the presentation of the search results in two dimensional images on the display. Alternatively, the input receiver may detect display input from the display that indicates the display supports three dimensional images such that a three dimensional formatting software application causes the presentation of the search results in three dimensional images on the display.

Additional aspects of the system may include a plane selection input received from the display and causes the reformatting of the presentation of the search results based on the plane selection input using the formatting software application such that the formatting software application is selected from the group consisting of the two dimensional formatting software application and the three dimensional formatting software application.

Other aspects may include a plurality of subdisplays detected as part of the media playing system and the system causes a split presentation of the search results in a plurality of search planes such that a subset of the plurality of search planes are presented on each subdisplay of the media playing system. Further, the server sorting software application can be implemented on the media playing system and the system formatting application can be implemented on a server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein.

DETAILED DESCRIPTION

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Figure 1:
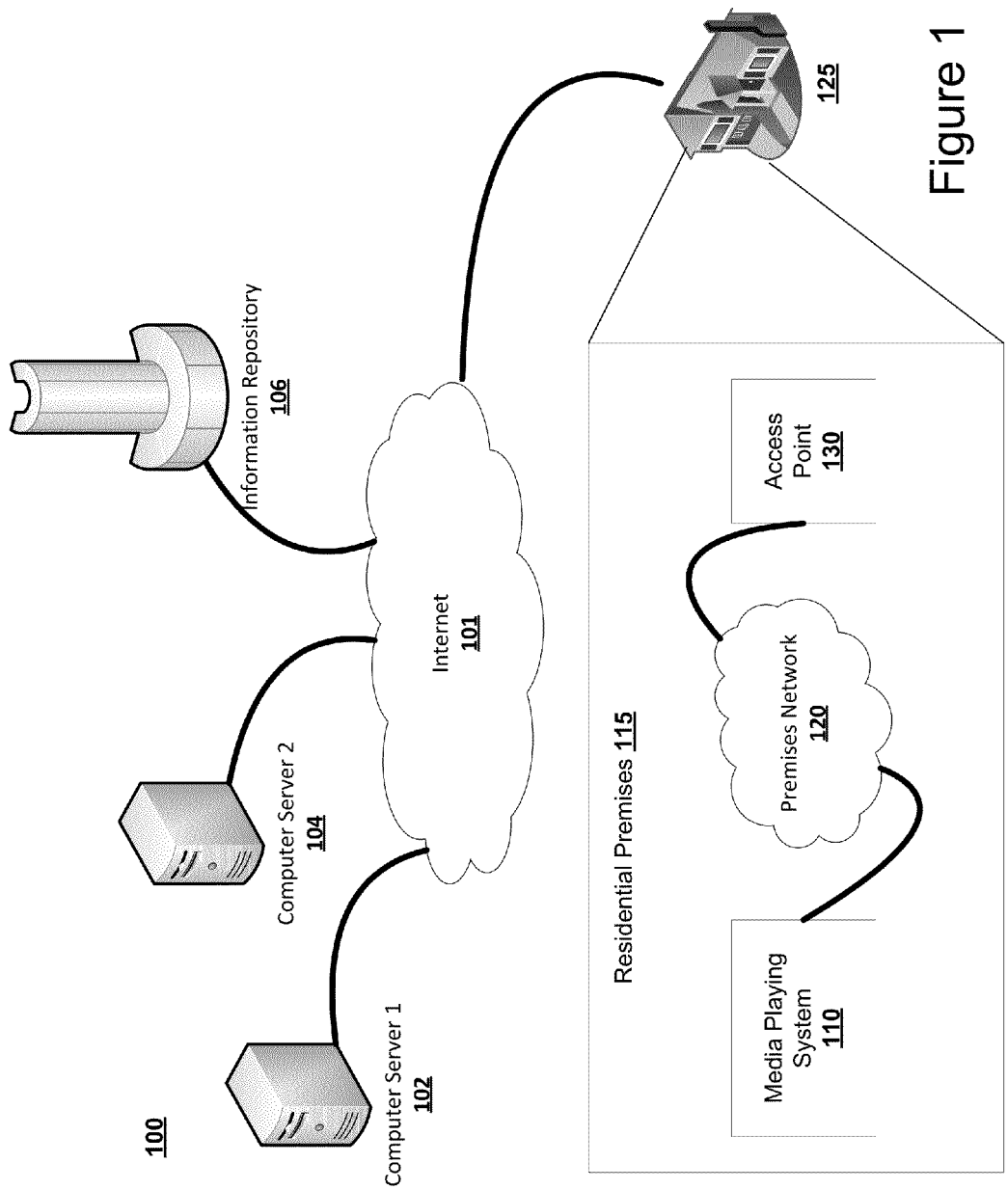
FIG. 1 is a functional block diagram of an exemplary system illustrating aspects of the present disclosure.

FIG. 1 is an exemplary functional block 100 diagram illustrating aspects of the present disclosure that include, but are not limited to, a media playing system (MPS) 110 located within a residential premises (115, 125). Such an MPS 110 may be coupled to a premises communication network 120 which in turn may be coupled to an access point 130. Further, the access point provides elements coupled to the premises network 120 access to the Internet 101 or other communication network as well as remote computer servers (102, 104) and information repositories (106).

The MPS 110 may be any media playing device that includes, but is not limited to, a computer, tablet computer, mobile phone, smartphone, a television, a DVR or cable/satellite set-top box, DVD or Blu-Ray disc player, a gaming system, any other media playing system known in the art or a combination of the above. The media playing system 110 may include processors, storage devices, communication interfaces (including user interfaces), input receivers, displays, and software applications. A media playing system 110 may allow a user to view any type of digital content (Internet websites, documents, images, videos, etc.). Further, such a media playing system 110 may be used to search the Internet or any other information repositories (e.g. trailer or movie content provided by a cable or satellite provider) based on a keyword or search term(s).

For example, a user of a media playing system 110 may be watching a movie. While viewing the movie, the user may perform a search on the media playing system 110. The user may initiate a search using a search engine program and an input device (e.g. remote control, voice recognition, mouse, touchscreen, etc.). The user may search for the actor in the movie that is being viewed. Further, software applications on the MPS 110 may receive one or more search terms from one or more user interfaces or input receivers of the media playing system 110 and then perform a search of the Internet or one or more informational repositories 106 to obtain a list of search results. The search may be performed by a search engine residing on the media playing system 110 or on remote server (102 and 104) to search databases and information repositories 106 that contain content or information related to the actor. The media playing 110 system may receive the search results and sort them according to certain categories such as movies, information web sites, photos, etc. Further, the media playing system 110 may then present the search results on its display on different planes such that each category of search results is on a different search plane (See FIGS. 5A-5B).

In alternative embodiments, a remote server (102, 104) may implement a search engine and sort the returned list of search results into one or more categories using one or more sorting programs. Further, presentation and information computer programs on the remote server (102, 104) may provide instructions to the media playing system 110 that displays the search results in different search planes, each search plane corresponding to a category.

Figure 2:
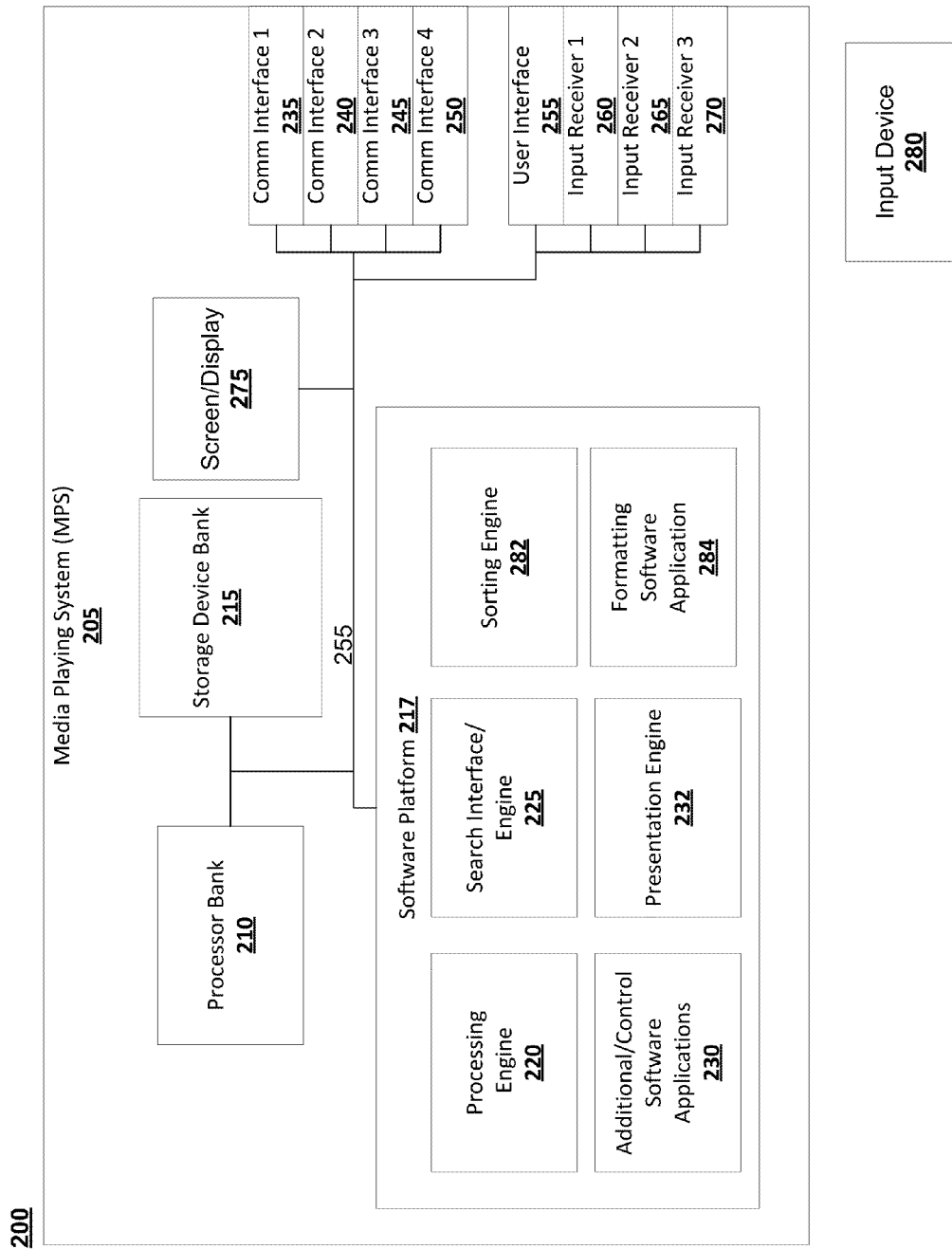
FIGS. 2-4 are functional block diagrams of exemplary devices each illustrating aspects of the present disclosure.

FIG. 2 is a functional block diagrams of exemplary media playing system (MPS) 205 illustrating aspects of the present disclosure. The MPS 205 may be any media playing device that includes, but is not limited to, a computer, tablet computer, mobile phone, smartphone, a television, a DVR or cable/satellite set-top box, DVD or Blu-Ray disc player, a gaming system, any other media playing system known in the art or a combination of the above. Further, the exemplary media playing system 205 may comprise of several components that includes a processor bank 210, storage device bank 215, screen/display 275, a software platform 217, one or more communication interfaces (235-250), a user interface 255, and one or more input receivers (260-270) that may interact with one or more input devices 280.

The processor bank 210 may include one or more processors that may be co-located with each other or may be located in different parts of the MPS 205. The storage device bank 215 may include one or more storage devices. Types of storage devices may include memory devices, electronic memory, optical memory, and removable storage media. The one or more software applications 217 may include a processing engine 220, a search interface/engine 225, sorting engine 282, formatting software application 284, presentation engine 232 and additional/control software applications 230. Further, the additional/control software applications 230 may include control software applications that implement software functions that assist in performing certain tasks for the MPS 205 such as providing access to a communication network, executing an operating system, managing software drivers for peripheral components, and processing information. In addition, the additional/control software application may also include software drivers for peripheral components, user interface computer programs, debugging and troubleshooting software tools. Also, the additional/control software applications may include an operating system supported by the MPS 205. Such operating systems are known in the art for such an MPS system shown in FIGS. 1 and 2 but may also include computer and smartphone operating systems (e.g. Droid, Symbian, IOS, Windows 7, Linux, Windows Mobile, MacOS, etc.).

The search interface/engine 225 may cause a software application to be displayed on the screen/display 275 of the MPS 205 such that a user may enter a keyword to search. In one embodiment, the search interface/engine may then transmit the keyword to processing engine 320 which in turn requests across one of the communication interfaces (235-250) over a communication network to a search engine residing on a remote computer server to perform a search based on the keyword. The search engine may then return a list of Internet search results to processing engine 220 of the MPS 305 across one of the communication interfaces (235-350) over the communication network. The processing engine 220 may then provide the list of search results to the search interface/engine 225 or store the Internet search results in one of the storage devices in the storage device bank 215 to be accessed in the future by the user. According to different embodiments, the search interface/engine 225 may access one of the storage devices to retrieve saved Internet results based on user input received from the input device 280 via the one or more input receivers (260-270) or receive the Internet search results from the processing engine 220. Further, the search interface/engine 225 may then cause the Internet search results to be displayed on the screen/display 275 of the MPS 205 in conjunction with the presentation engine 232. The Internet search results may be displayed in a variety of ways that include, but are not limited to, displaying the Internet search results on the entire screen, displaying the Internet search results side by side with the television/digital content being viewed by the user, or displaying the Internet search results with the digital content being viewed by the user in a picture-in-picture mode. In another embodiment, the search interface/engine 225 may perform the search instead of a remote server. After returning a list of search results, the search interface/engine 225 may for such results allow the processing engine 220 or sorting engine 282 to classify the search results into one or more categories.

The sorting engine 282 analyzes the list of search results obtained by the search engine and then classifies each search result into a category. For example, the sorting engine 282 may be configured to classify the list of search results by media type—websites, images, or video. Classification categories may be configured by the user or classification may be performed based on default settings of the search engine. Alternatively, for example, the list of search results may be based on a search of a movie title. Thus, the sorting engine 282 may be configured to classify the search results based on movie, actors, director, screenwriter, etc. After the list of search results are classified, the sorting engine 282 may transmit the sorted and classified search results to the presentation engine 232.

The presentation engine 232 works in conjunction with the formatting software application 282 to present the search results on the screen/display 275 of the MPS 205 in such a way to show the classification of the categories in a clear manner. The presentation of the search results depends on the type of screen/display 275. The presentation engine 232 and formatting software application 284 may present the search results in one manner if the screen 275 is capable of only two dimensional display. Otherwise, if it is determined that the screen 275 is capable of three dimensional display, then the presentation engine 232 and formatting software application 284 may present the search results in a different manner utilizing three dimensional display technology.

For example, the presentation engine 232 and formatting software application 284 may determine that the screen 275 supports only 2D or that the user of the MPS 205 has configured to only present search results using 2D display technology. Thus, the presentation engine 232 and formatting software application may generate different search planes that are easily viewed on the 2D display 275, similar to the search planes show in FIGS. 5A and 5B. Alternatively, the presentation engine 232 and formatting software application 284 may determine that the screen 275 supports 3D or that the user of the MPS 205 has configured to only present search results using 3D display technology. Thus, the presentation engine 232 and formatting software application may generate different search planes that are easily viewed on the 2D display 275, similar to the search planes show in FIGS. 5A and 5B. However, due to the 3D technology, search planes may be transparent to enhance the viewing of the different search planes to the user. Details of such presentation and formatting will be discussed when describing FIGS. 5A and 5B.

Further, a user of the MPS 205 may use one or more input devices 280 to initiate the search as well as configure and control the presentation of the search results. Examples of input devices include a remote control, stylus or ability to touch the screen 275, voice activation, keyboard, mouse or any other input device known in the art. Accordingly, input receivers (260-270) may receive input from the different input devices such as infra-red or RF receiver, touchscreen, speech recognition devices, or any other input receiver known in the art.

The user interface 255 may be displayed on screen 275 and may be, for example, a web browser or some other graphical user interface that allows the user to view input. In the case of the user providing search terms using voice activation and speech recognition technology, the search interface/engine 225 working in conjunction with the user interface as well as any input device 280 and any input receiver (260-270) to display the search terms on the user interface 255 as the user pronounces such terms. Then when the user provides an appropriate search command, the input device 280 and input receivers (260-270) may cause (directly or indirectly) the search interface/engine 225 to perform the search.

Each of the communication interfaces (235-250) shown in FIG. 2 may be software or hardware associated in communicating to other devices. The communication interfaces (235-250) may be of different types that include a user interface, USB, Ethernet, WiFi, WiMax, wireless, optical, cellular, or any other communication interface coupled to communication network.

An intra-device communication link 255 between the processor bank 210, storage device bank 215, software applications 217, screen/display 275 and communication interfaces (235-250) may be one of several types that include a bus or other communication mechanism.

Figure 3:
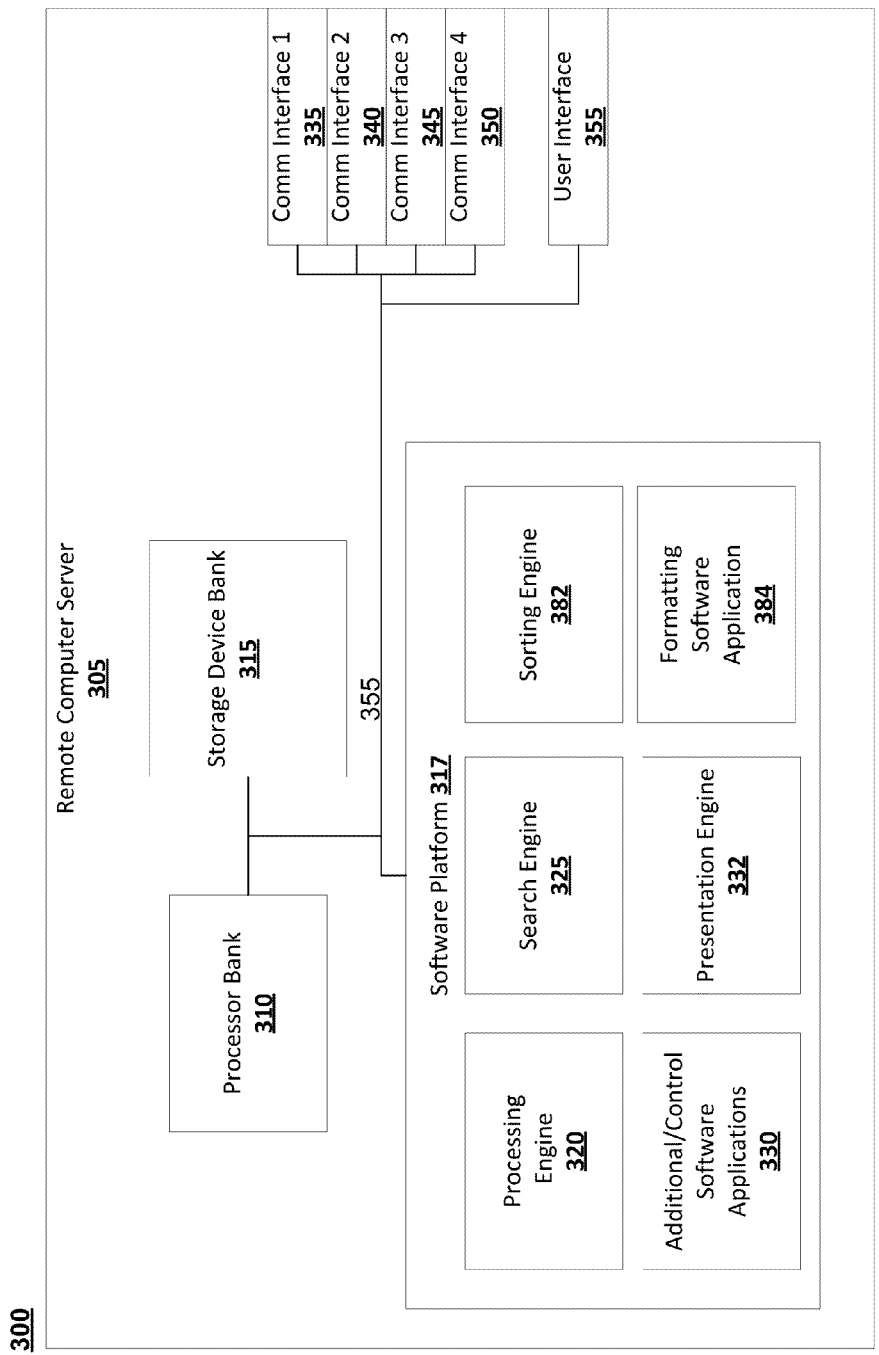

FIG. 3 is a functional block diagrams of exemplary remote server 305 that may work in conjunction with a media playing system (MPS) shown in FIGS. 1 and 2 illustrating aspects of the present disclosure. Such a remote server 305 may be comprised of several components that includes a processor bank 310, storage device bank 315, a software platform 317, one or more communication interfaces (335-350), and a user interface 355.

The processor bank 310 may include one or more processors that may be co-located with each other or may be located in different parts of the remote server 305. The storage device bank 315 may include one or more storage devices. Types of storage devices may include memory devices, electronic memory, optical memory, and removable storage media. The one or more software applications 317 may include a processing engine 320, a search engine 325, sorting engine 382, formatting software application 384, presentation engine 332 and additional/control software applications 330. Further, the additional/control software applications 330 may include control software applications that implement software functions that assist in performing certain tasks for the MPS 305 such as providing access to a communication network, executing an operating system, managing software drivers for peripheral components, and processing information. In addition, the additional/control software application may also include software drivers for peripheral components, user interface computer programs, debugging and troubleshooting software tools. Also, the additional/control software applications may include an operating system supported by the remote server. Such operating systems are known in the art for such a remote server but may also include computer and smartphone operating systems (e.g. Windows 7, Linux, Android, IOS UNIX, previous version of Windows and MacOS, etc.).

Turning to describing the other software applications (320, 325, 332, 382, 384) included in the software platform 317 of the remote server 305, a person of ordinary skill in the art would understand that such remote server would be coupled and in communication with an MPS. However, in some embodiments, such an MPS may not include all or may include only a subset of software application as depicted in FIG. 2 (220, 225, 230, 232, 282, 284). Thus, in such embodiments the remote server may include analogous software applications (320, 325, 332, 382, 384) that would perform similar if not the same functions as described for the software applications (220, 225, 230, 232, 282, 284) residing on the MPS shown in FIG. 2.

Accordingly, the search engine 325 may receive a keyword or other search terms (e.g. text, image, video, etc.) from an MPS through processing engine 320 and one of the communication interfaces (335-350) over a communication network and perform a search based on the keyword or search terms. The search engine 325 may then return a list of Internet search results to processing engine 320. The processing engine 320 may then provide the list to the search engine 325 or store the Internet search results in of the storage devices in the storage device bank 315 to be accessed in the future by the user. According to different embodiments, the search engine 325 may access one of the storage devices to retrieve saved Internet results based on user input received through the MPS. Further, the search engine 325 may then provide instructions to the MPS that cause the Internet search results to be displayed on the screen/display of the MPS 205 in conjunction with the presentation engine 332 and the formatting software application 384. The Internet search results may be displayed in a variety of ways that include, but are not limited to, displaying the Internet search results on the entire screen, displaying the Internet search results side by side with the television/digital content being viewed by the user, or displaying the Internet Search results with the digital content being viewed by the user in a picture-in-picture mode. After returning a list of search results, the search engine 325 may relay such results to the processing engine 320 or sorting engine 382 to classify the search results into one or more categories.

The sorting engine 382 analyzes the list of search results obtained by the search engine 320 and then classifies each search result into a category. For example, the sorting engine 382 may be configured to classify the list of search results by media type—websites, images, or video. Alternatively, for example, the list of search results may be based on a search of a movie title. Thus, the sorting engine 382 may be configured to classify the search results based on movie, actors, director, screenwriter, etc. After the list of search results are classified, the sorting engine 382 may transmit the sorted and classified search results to the presentation engine 332.

The presentation engine 332 works in conjunction with the formatting software application 382 to provide instructions to the MPS present the search results on the screen/display 275 of the MPS 205 in such a way to show the classification of the categories in a clear manner. The presentation of the search results depends on the type of screen/display 275 of the MPS 205. The presentation engine 332 and formatting software application 384 may provide a certain set of instructions to present the search results in one manner if the screen 275 is capable of only two dimensional display. Otherwise, if it is determined that the screen 275 is capable of three dimensional display, then the presentation engine 332 and formatting software application 384 may provide another set of instructions and present the search results in a different manner utilizing three dimensional display technology.

For example, the presentation engine 332 and formatting software application 384 may determine that the screen 275 supports only 2D or that the user of the MPS 205 has configured to only present search results using 2D display technology. Thus, the presentation engine 332 and formatting software application may provide instructions to the MPS 205 to generate different search planes that are easily viewed on the 2D display 275, similar to the search planes shown in FIGS. 5A and 5B. Alternatively, the presentation engine 332 and formatting software application 284 may determine that the screen 275 supports 3D or that the user of the MPS 205 has configured to only present search results using 3D display technology. Thus, the presentation engine 332 and formatting software application may provide different instructions to the MPS to generate different search planes that are easily viewed on the 2D display 275, similar to the search planes show in FIGS. 5A and 5B. However, due to the 3D technology, search planes may be transparent to enhance the viewing of the different search planes to the user. Details of such presentation and formatting will be discussed when describing FIGS. 5A and 5B.

The user interface 355 may be displayed on screen (not shown) of the remote server and may be, for example, a web browser or some other graphical user interface that allows a remote server user to view and enter input to configure the remote server 305.

Each of the communication interfaces (335-350) shown in FIG. 3 may be software or hardware associated in communicating to other devices. The communication interfaces (335-350) may be of different types that include a user interface, USB, Ethernet, WiFi, WiMax, wireless, optical, cellular, or any other communication interface coupled to communication network.

An intra-device communication link 355 between the processor bank 310, storage device bank 315, software applications 317, and communication interfaces (335-350) may be one of several types that include a bus or other communication mechanism.

Figure 4:
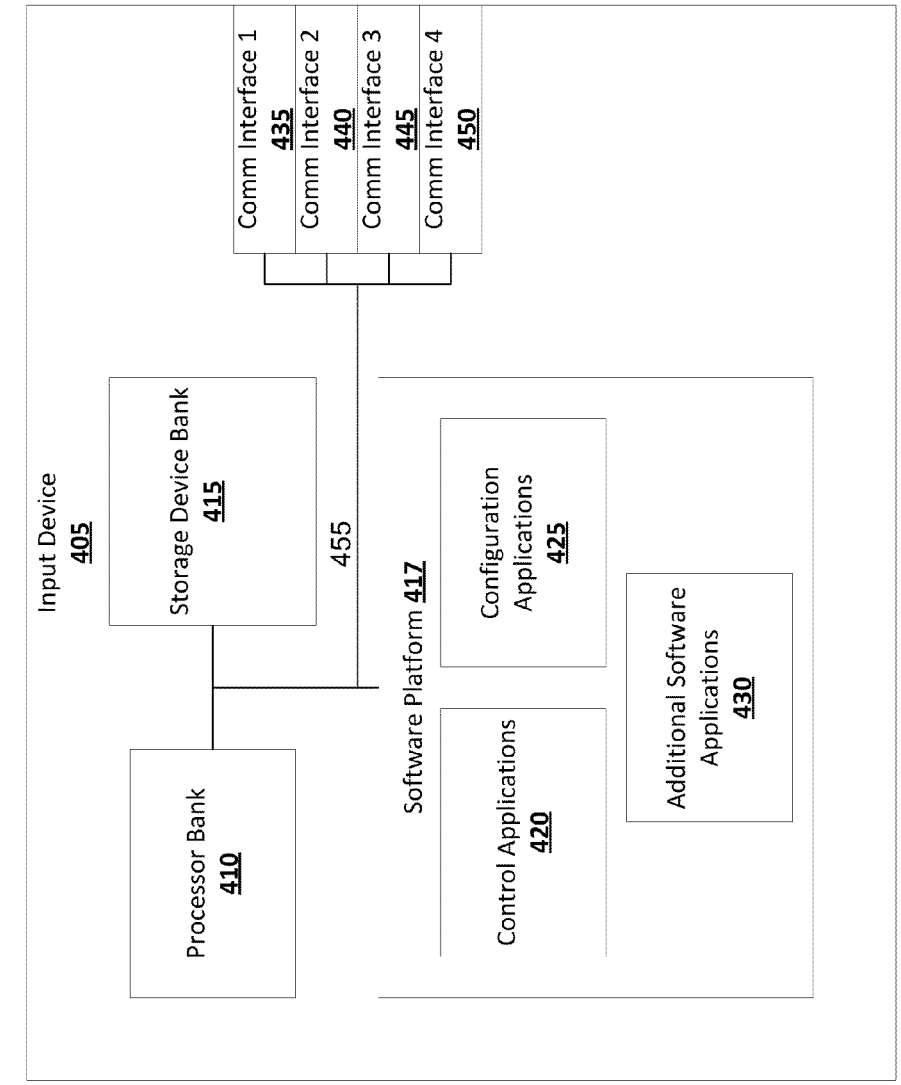

FIG. 4 is a functional block diagrams of exemplary input device 405 that may work in conjunction with a media playing system (MPS) shown in FIGS. 1 and 2 illustrating aspects of the present disclosure. Such an input device 405 may be comprised of several components that includes a processor bank 410, storage device bank 415, a software platform 417, and one or more communication interfaces (435-450).

The processor bank 310 may include one or more processors that may be co-located with each other or may be located in different parts of the input device 405. The storage device bank 415 may include one or more storage devices. Types of storage devices may include memory devices, electronic memory, optical memory, and removable storage media. The one or more software applications 417 may include a control applications 420, configuration applications 42 and additional software applications 430. Further, the additional and control software applications (420 and 430) may include control software applications that implement software functions that assist in performing certain tasks for the input device 405 such as providing access to a communication link (e.g. wired, wireless, Bluetooth, infra-red, RF, etc.), executing an operating system, managing software drivers for peripheral components, and processing information. In addition, the additional and control software application (420 and 430) may also include software drivers for peripheral components, user interface computer programs, debugging and troubleshooting software tools. Also, the additional and control software applications (420 and 430) may include an operating system supported by the remote server. Such operating systems are known in the art for such input devices but may also include computer and smartphone operating systems (e.g. Droid, Symbian, Windows mobile, Windows 7, Linux, UNIX, previous version of Windows and MacOS, etc.).

Further, the configuration applications 425 allow for a user to configure an MPS as shown in FIGS. 1 and 2. For example, a screen/display of the MPS may be able to support 2D or 3D technology. Thus, the input device 405 and may be used to configure the screen/display of the MPS to support only 2D to preserve other resources (e.g. power, battery life, processing power, etc.). Moreover, the configuration applications may allow a user to configure certain constraints or provide certain features for a search. For example, the user may configure a search in certain specified categories. For example, if the search term is a name of an actor, the user may configure that the search results be classified into three categories such as website, images, and videos. Alternatively, if the search is of a movie, the user may request the search results be classified according to each actor in the movie, the director, the screenwriter, etc.

Each of the communication interfaces (435-450) shown in FIG. 4 may be software or hardware associated in communicating to other devices. The communication interfaces (435-450) may be of different types that include a user interface, USB, Ethernet, WiFi, WiMax, wireless, optical, cellular, or any other communication interface coupled to communication network.

An intra-device communication link 455 between the processor bank 410, storage device bank 415, software applications 417, and communication interfaces (435-350) may be one of several types that include a bus or other communication mechanism.

Figure 5A:
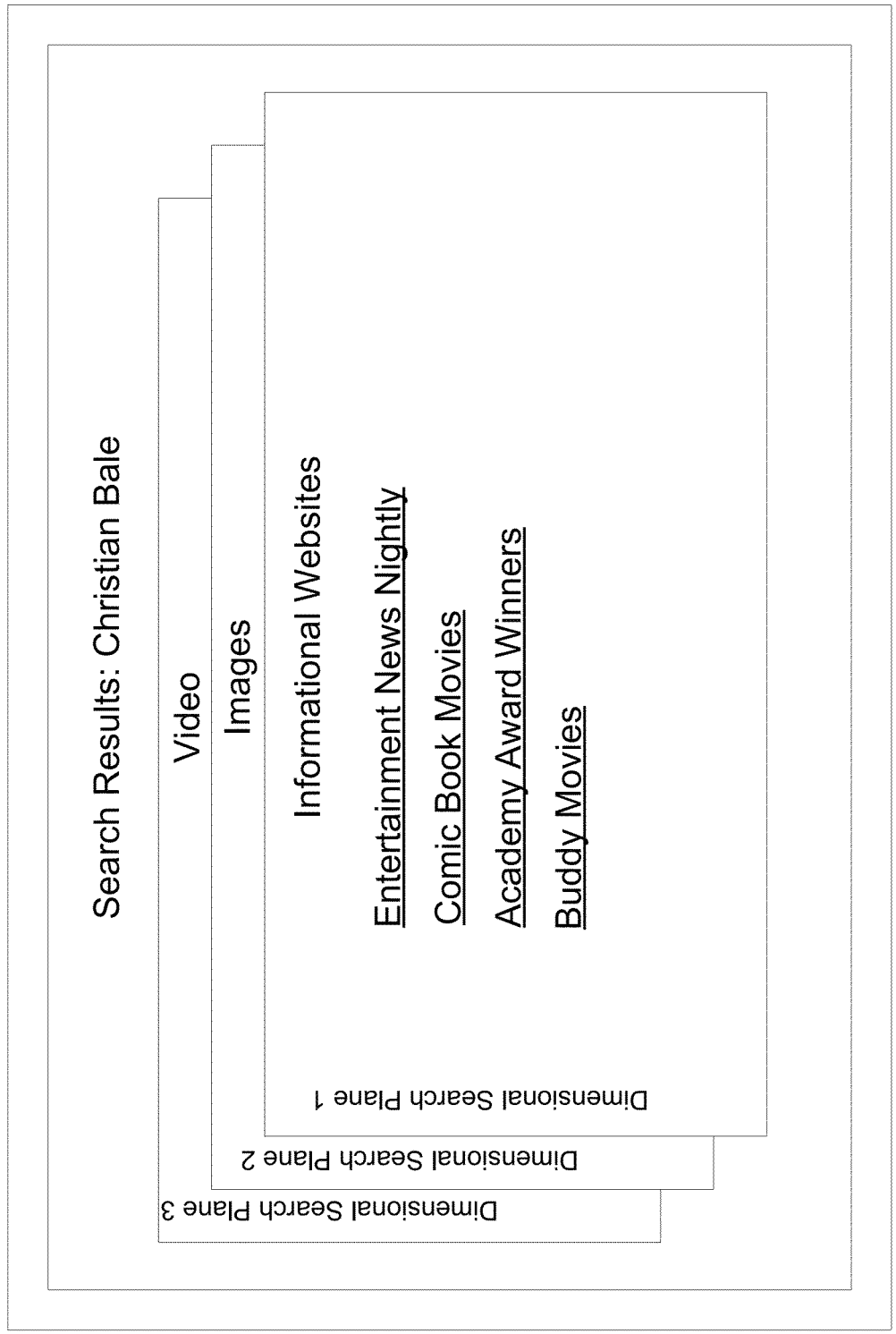
FIGS. 5A-5B are exemplary displays of search results using one or more search planes illustrating aspects of the present disclosure.
Figure 5B:

FIGS. 5A-5B are exemplary displays of search results using one or more search planes illustrating aspects of the present disclosure. Referring to FIG. 5A, presenting search result in a multidimensional manner on a 2D display may includes providing three search planes, each plane corresponding to a category of search results. On a 3D display, there also may be three planes, each plane corresponding to a category of search results, however, on a 3D display the search planes may be transparent in nature so that the user may view all the planes, each at different level of opaqueness or transparency. Each plane may be navigated using various input mechanisms including touch screen, mouse keyboard, voice recognition, gesture, or optical mechanisms known in the art. Thus, embodiments may use spatial differentiation to categorize search results and presenting them to a 2D or 3D display of a MPS or other client computing device.

In some embodiments the algorithms implemented by the client (MPS) software applications or server software applications to organize the search results into different groups. For example, if the keyword or phrase was the name of an actor, then the sorting software applications implementing the algorithms to organize the search results by informational (mostly text) websites such as entertainment websites, blogs, etc, 2D images of the actor such as still photographs of the actor at awards shows or interviews, and video of the actor such as movies in streaming video format or movie trailers. The formatting software application may format the search results such that each group is on a different dimensional plane when presented on a display of the MPS or client computing device as shown in FIGS. 1A-1B. By example, referring to FIG. 1A, a keyword "Christian Bale" was entered by user into a user interface of a MPS and transmitted to a search engine running on a remote computer server. "Christian Bale" is an actor. After or while processing the search results based on the keyword "Christian Bale", the sorting software applications (one of the remote computer server or the MPS) may organize the search results into three major categories such as: (1) informational websites that include blogs, entertainment websites, movie websites, celebrity websites, fan websites, etc.; (2) images such as still photographs of interviews and red carpets events, still photographs from movies and television, etc.; and (3) videos such as movies starring "Christian Bale", or trailers of such movies, interviews, etc. Further, the formatting software application may generate three different search planes, each corresponding to a category. In addition, the formatting software may present the search results in such a multidimensional manner in one way for client computing devices that have 2D displays and another way for client computing devices that have displays with 3D technology. Note, that the sorting software applications and the formatting software applications may be implemented by the computer server or the MPS or a combination of both.

Alternative embodiments may have the planes present search results in such a manner that two edges of a plane correspond to two axes, each axis associated with a category of search results. For example, if user enters a keyword "Casablanca", the movie, there may be a plane corresponding to Humphrey Bogart where on axis corresponds to time (in years) and another axis corresponds to movies such that the plane lists Humphrey Bogart movies in chronological order. By example, additional embodiments may include a 3D movie in a first plane, menu items (cast crew, etc.) in a second plane, and a movie website a third plane.

Referring to FIG. 5A, a user may view three search planes for an actor such as "Christian Bale." Each search plane represents a different category of the search results. In the exemplary embodiment shown in FIG. 5A, the search results are classified into three categories—informational websites, images, and video. When viewing each search plane, the user may view a list of Internet links to different informational websites, images, and movies, accordingly. In FIG. 5A, a user is viewing three search planes (informational websites, images, and video) on an MPS supporting 2D display technology. The search plane in the foreground and viewed in its entirety relates informational websites. Further, the user may select via an input device (touchscreen, voice activation, mouse, keyboard, etc.) to view the Video search plane. Thus, referring to FIG. 5B, the video search plane is displayed in the foreground of the screen and the user may view the links for each video search result. In addition, the user may select any link on any plane using an input device (touchscreen, voice activation, mouse, keyboard, etc.) to view such digital content (e.g. informational websites, images, and video).

Figure 6:
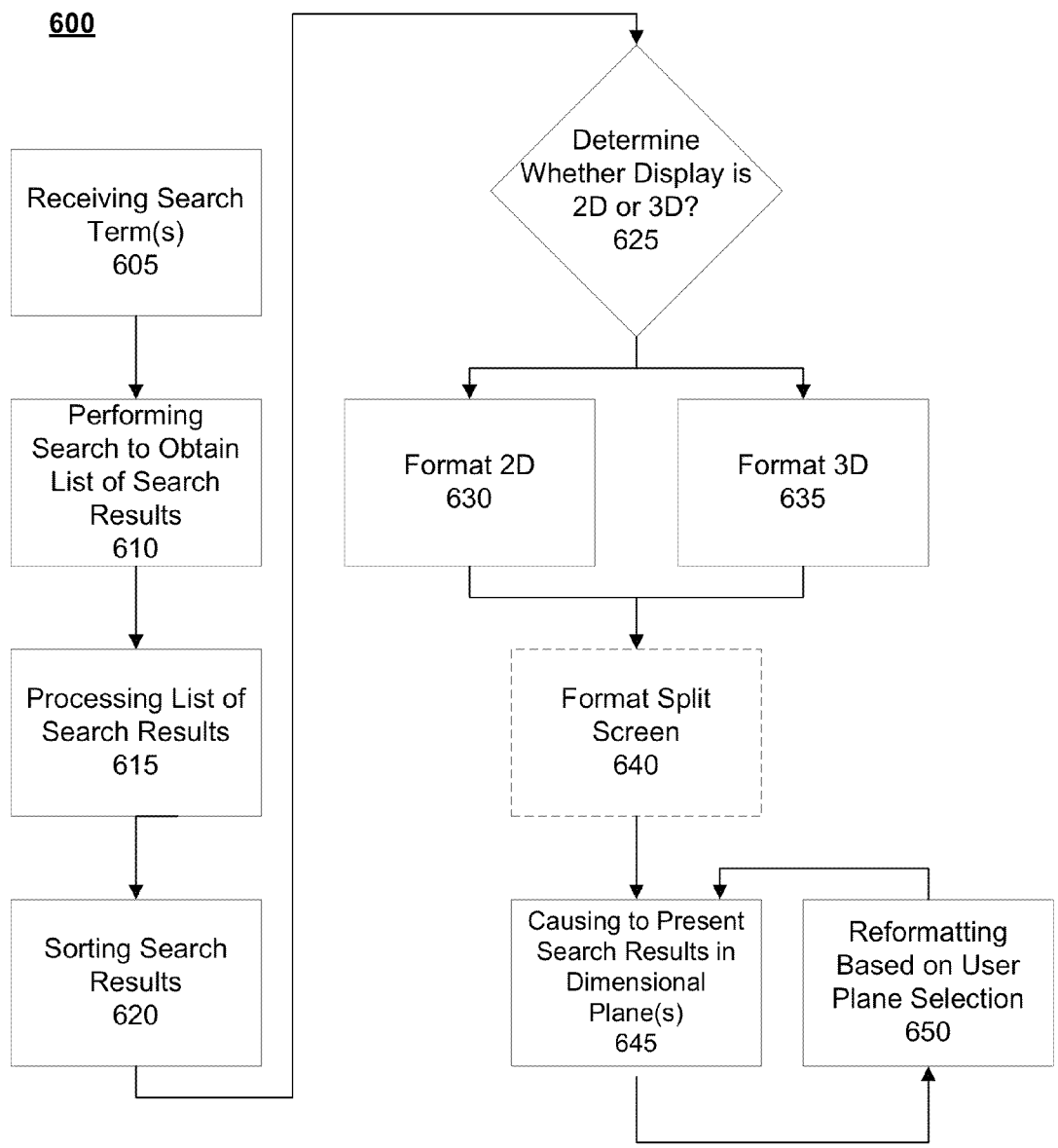
FIG. 6 is a flowchart for an exemplary method illustrating aspects of the present disclosure.

FIG. 6 is a flowchart for an exemplary method illustrating aspects of the present disclosure. A step in the exemplary method may be receiving one or more search terms from one or more user interfaces of a media playing system or client computing device, as shown in block 605. A further step may be performing a search of one or more informational repositories to obtain a list of search results wherein the informational repositories may include the Internet and one or more databases, as shown in block 610. An additional step may be processing the list of search results using one or more software applications to classify each search result in one of a plurality of categories, as shown in block 615. Another step may be sorting the list of search results using a sorting software application into one of a plurality of categories, as shown in block 620. A decisional step may include determining whether the display supports 2D or 3D display technology, as shown in block 625. If the display supports only, or is configured to support 2D technology, then the list of search results are formatted to be viewed on a 2D display using a two dimensional formatting software application, as shown in block 630. If the display supports only, or is configured to support 3D technology, then the list of search results are formatted to be viewed on a 3D display using a three dimensional formatting software application, as shown in block 635. An optional step in the example method may be detecting a plurality of subdisplays as part of the screen of the media playing system and causing a split presentation of the search results in a plurality of search planes such that a subset of the plurality of search planes are presented on each display of the media playing system, as shown in block 640. A further step may be causing a presentation of the search results in a plurality of dimensional planes on a display of the media playing system such that each dimensional plane corresponds to one of the plurality of categories, as shown in block 645. Another step may be receiving a plane selection input from the display and reformatting the presentation of the search results based on the place selection input using the formatting software application, as shown in block 650. For example, if the search plane presented in the foreground of the display is directed to informational website but the user then selects the search plane in the back ground directed to videos, the result is that the search plane directed to videos may be moved to the foreground and the search plane listing information websites maybe moved to the back ground (See FIG. 5A-5B).

The foregoing is illustrative only and is not intended to be in any way limiting. Reference is made to the accompanying drawings, which form a part hereof. In the drawings, similar symbols typically identify similar components, unless context dictates otherwise.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing multidimensional search results on a plurality of search planes, comprising:
receiving one or more search terms from one or more user interfaces of a media playing system;
performing a search of one or more informational repositories to obtain a list of search results wherein the informational repositories include one or more databases accessed over the Internet;
processing the list of search results using one or more software applications to classify each search result in one of a plurality of categories;
receiving display input wherein the display input indicates a display of the media playing system supports three dimensional images;
formatting a presentation of the search results using a three dimensional formatting software application that displays the search results in a plurality of search planes each search plane substantially parallel to each other;
causing the presentation of the search results on the plurality of search planes on a three dimensional display of the media playing system;
wherein each search plane corresponds to one of the plurality of categories.

2. The method of claim 1, further comprising sorting the list of search results using a sorting software application into one of a plurality of categories.

3. The method of claim 1, further comprising:
receiving display input wherein the display input indicates the display supports two dimensional images;
formatting the presentation of the search results using a two dimensional formatting software application.

4. The method of claim 1, further comprising receiving a plane selection input from the display and reformatting the presentation of the search results based on the place selection input using the formatting software application wherein the formatting software application is selected from the group consisting of the two dimensional formatting software application and the three dimensional formatting software application.

5. The method of claim 1, further comprising:
detecting a plurality of subdisplays as part of a screen of the media playing system;
causing a split presentation of the search results on the plurality of search planes such that a subset of the plurality of search planes are presented on each display of the media playing system.

6. A system for providing multidimensional search results on a plurality of search planes, comprising:
one or more processors;
one or more storage devices coupled to the one or more processors;
one or more communication interfaces, a first communication interface coupled to the one or more processors and coupled to the communication network;
one or more user interfaces coupled to the one or more processors;
a display coupled to the one or more processors;
one or more software applications that: (i) receive one or more search terms from one or more user interfaces of the system; (ii) perform a search of one or more informational repositories to obtain a list of search results wherein the informational repositories include one or more databases accessed over the Internet; (iii) process the list of search results to classify each search result in one of a plurality of categories; (iv) receive display input wherein the display input indicates a display of the media playing system supports three dimensional images; (v) format a presentation of the search results using a three dimensional formatting software application that displays the search results in a plurality of search planes each search plane substantially parallel to each other; (vi) cause the presentation of the search results on the plurality of search planes on a three dimensional display of the media playing system;
wherein each search plane corresponds to one of the plurality of categories.

7. The system of claim 6, further comprising a sorting software application that groups the list of search results into one of the plurality of categories.

8. The system of claim 6, further comprising:
an first input receiver that detects display input from a first display that indicates the display supports two dimensional images;
a two dimensional formatting software application that causes the presentation of the search results on a two dimensional display.

9. The system of claim 6, wherein a plane selection input is received from the display and causes the reformatting the presentation of the search results based on the place selection input using the formatting software application wherein the formatting software application is selected from the group consisting of the two dimensional formatting software application and the three dimensional formatting software application.

10. The system of claim 6, wherein a plurality of subdisplays is detected as part of a screen of the media playing system and the system causes a split presentation of the search results on a plurality of search planes such that a subset of the plurality of search planes are presented on each subdisplay of the media playing system.

11. A system for providing multidimensional search results on a plurality of search planes, comprising:
   communication network;
   a remote computer server coupled to the communication network, the remote computer server having:
      one or more server processors;
      one or more server storage devices coupled to the one or more processors;
      one or more server software applications executed by the one or more processors;
      one or more server communication interfaces, a first server communication interface coupled to the one or more processors and coupled to the communication network;
   a media playing system coupled to the remote computer server over the communication network;
      one or more system processors;
      one or more system storage devices coupled to the one or more processors;
      one or more system software applications executed by the one or more processors;
      one or more system communication interfaces, a first system communication interface coupled to the one or more processors and coupled to the communication network;
      one or more user interfaces coupled to the one or more processors;
      a display coupled to the one or more processors;
   wherein one or more server software applications that:
      (i) receive one or more search term from one or more user interfaces of the system; (ii) perform a search of one or more informational repositories to obtain a list of search results wherein the informational repositories include one or more databases accessed over the Internet; (iii) process the list of search results to classify each search result in one of a plurality of categories; (iv) and transmit the list of search results to the media playing system over the communication network;
   wherein a first input receiver of the media playing system detects display input from a first display that indicates the first display supports three dimensional images that displays the search results in a plurality of search planes each search plane substantially parallel to each other and a three dimensional formatting software application causes the presentation of the search results on a three dimensional display.

12. The system of claim 11, wherein one or more system software application cause a presentation of the search results on the plurality of dimensional planes on the display of the media playing system such that each search plane corresponds to one of the plurality of categories.

13. The system of claim 11, further comprising a server sorting software application that groups the list of search results into one of the plurality of categories.

14. The system of claim 11, further comprising:
   an first input receiver located in the media player system, the first input receiver detects display input from a first display that indicates the display supports two dimensional images;
   a system two dimensional formatting software application that causes the presentation of the search results on a two dimensional display.

15. The system of claim 11, wherein a plane selection input is received from the display and causes the reformatting of the presentation of the search results based on the plane selection input using the formatting software application wherein the formatting software application is selected from the group consisting of the two dimensional formatting software application and the three dimensional formatting software application.

16. The system of claim 11, wherein a plurality of subdisplays is detected as part of a screen of the media playing system and the system causes a split presentation of the search results on the plurality of search planes such that a subset of the plurality of search planes are presented on each subdisplay of the media playing system.

17. The system of claim 15, wherein the server sorting software application can be implemented on the media playing system and the system formatting application can be implemented on a server.

* * * * *